United States Patent
Raines (10) Patent No.: US 10,434,918 B2
(45) Date of Patent: Oct. 8, 2019

(54) PNEUMATICALLY ACTUATED SEAT BOLSTER

(71) Applicant: Ford Global Technologies, LLC, Dearborn, MI (US)

(72) Inventor: Travis Justin Raines, Grosse Ile, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 95 days.

(21) Appl. No.: 15/484,559

(22) Filed: Apr. 11, 2017

(65) Prior Publication Data

US 2018/0290570 A1    Oct. 11, 2018

(51) Int. Cl.
  *B60N 2/36*  (2006.01)
  *B60N 2/90*  (2018.01)
  *B60N 2/20*  (2006.01)

(52) U.S. Cl.
  CPC ............. *B60N 2/99* (2018.02); *B60N 2/206* (2013.01); *B60N 2/36* (2013.01); *B60N 2/914* (2018.02); *B60N 2002/363* (2013.01)

(58) Field of Classification Search
  CPC .......... B60N 2/99; B60N 2/914; B60N 2/206; B60N 2/36
  USPC ........................................ 297/284.6, 284.9
  See application file for complete search history.

(56) References Cited

U.S. PATENT DOCUMENTS

| | | | |
|---|---|---|---|
| 6,203,105 B1 * | 3/2001 | Rhodes, Jr. | A47C 4/54 297/284.6 |
| 6,912,748 B2 | 7/2005 | VanSickle | |
| 6,916,300 B2 * | 7/2005 | Hester | A61H 23/04 297/284.6 |
| 7,108,323 B2 | 9/2006 | Welch et al. | |
| 9,145,073 B2 | 9/2015 | Andersson et al. | |
| 9,937,836 B2 * | 4/2018 | Dry | B60N 2/914 |
| 2005/0082895 A1 * | 4/2005 | Kimmig | A47C 7/467 297/452.41 |
| 2006/0163933 A1 * | 7/2006 | Radu | B60N 2/767 297/411.35 |
| 2007/0057551 A1 * | 3/2007 | Lachenmann | B60N 2/99 297/284.9 |
| 2010/0244504 A1 * | 9/2010 | Colja | A61H 9/0078 297/180.1 |
| 2015/0115678 A1 * | 4/2015 | Hosbach | A47C 7/467 297/284.6 |

FOREIGN PATENT DOCUMENTS

DE        10355519 A1 *  6/2005   ......... B60N 2/0224

* cited by examiner

*Primary Examiner* — Syed A Islam
(74) *Attorney, Agent, or Firm* — Vichit Chea; Price Heneveld LLP (57) ABSTRACT

A vehicle seat includes a cushion and a seatback coupled with the cushion and rotatable between collapsed and open positions. The seatback includes a first inflatable bladder within an interior of the seatback, a pneumatic actuator fluidically coupled with the bladder and configurable between a compressed condition and a withdrawn condition, and a control cable coupled between the actuator and the cushion for linking the configuration of the actuator with the position of the seatback.

20 Claims, 5 Drawing Sheets

PNEUMATICALLY ACTUATED SEAT BOLSTER

FIELD OF THE DISCLOSURE

The present disclosure generally relates to a folding vehicle seat having a collapsible portion of the seatback. In particular, the seatback includes a fluid actuator to cause collapsing and expanding of the collapsible portion.

BACKGROUND OF THE DISCLOSURE

Vehicles may include foldable seats in which a seatback thereof can be rotated in a downward direction into contact with a corresponding cushion. Folding seats can be used in connection with, for example, the rear seats of a vehicle such that the seatbacks thereof can be folded, when not occupied by a passenger or the like, to expand the cargo area provided by the trunk of the vehicle. Accordingly, the degree to which the seatback can be folded impacts the useable cargo area achieved by such folding. Due to ergonomic and other concerns, seatbacks and cushions may have contours and thicknesses that limit the folding of the seatback such that a rear surface of the seatback, on which cargo is supported, is angled significantly upward from the adjacent trunk surface. This can impact both the useable cargo space, as well as the ability to reliably place objects on the sloped surface. Accordingly, improvements to vehicle seats are desired that allow for a greater degree of folding.

SUMMARY OF THE DISCLOSURE

According to one aspect of the present disclosure, a vehicle seat includes a cushion and a seatback coupled with the cushion and rotatable between collapsed and open positions. The seatback includes a first inflatable bladder within an interior of the seatback, a pneumatic actuator fluidically coupled with the bladder and configurable between a compressed condition and a withdrawn condition, and a control cable coupled between the actuator and the cushion for linking the configuration of the actuator with the position of the seatback.

Embodiments of this aspect can include any one or a combination of the following features:
  the fluidic coupling of the pneumatic actuator with the inflatable bladder causes inflation and deflation of the bladder with configuration of the actuator in the compressed condition and the withdrawn condition, respectively, and the inflation and deflation of the inflatable bladder causes a thickness of a portion of the seatback corresponding with the bladder to increase and decrease, respectively;
  the first inflatable bladder is positioned beneath a seatback coverstock in a bolster area of the seatback;
  a second inflatable bladder is included within the interior of the seatback, the pneumatic actuator being further fluidically coupled with the second inflatable bladder;
  the linking of the configuration of the actuator with the position of the seatback by the control cable is such that the thickness of the portion of the seatback is at a maximum when the seatback is in the open position and is at a minimum when the seatback is in the collapsed position;
  the fluidic coupling of the pneumatic actuator with the inflatable bladder is such that movement of the actuator from the withdrawn position to the compressed condition causes a fluid pressure within the bladder to increase;
  the increase in the fluid pressure urges the bladder into an expanded condition, and movement of the actuator from the compressed position to the withdrawn condition causes a fluid pressure within the bladder to decrease, urging the bladder into a contracted position;
  the pneumatic actuator includes an elongate chamber having an outlet and a piston sealingly engaged with an inner perimeter of the chamber and slideable toward and away from the outlet, the compressed condition corresponding to the piston being in a proximal-most position with respect to the opening and the withdrawn position corresponding to the piston being in a distal-most position with respect to the opening;
  the control cable is coupled with the piston of the pneumatic actuator to move the piston between the proximal-most positon and the distal-most position;
  the pneumatic actuator is coupled with the first inflatable bladder at the outlet of the elongate chamber;
  the control cable defines a rigid portion coupled with the piston and applies a force thereon to urge the piston toward the compressed position;
  the pneumatic actuator further includes a spring biasing the piston toward the proximal-most position, the control cable acting against the spring under tension to pull the piston into the distal-most position when the seatback is moved into the collapsed position; and
  the control cable is internal within the seatback and exits the seatback in a location that is disposed toward a rear of the seatback when the seatback is in the open position.

According to another aspect of the present disclosure, a vehicle seat includes a cushion and a seatback coupled with the cushion and rotatable between collapsed and open positions. The seatback has an inflatable bladder within an interior of the seatback, an elongate chamber fluidically coupled with the inflatable bladder and a piston sealingly engaged with an inner perimeter of the chamber, and a control cable coupled between the piston and the cushion for sliding the piston within the chamber by rotation of the seatback.

According to another aspect of the present disclosure, a vehicle includes a seatback coupled within an interior of the vehicle and rotatable between collapsed and open positions, a first inflatable bladder within an interior of the seatback, a pneumatic actuator fluidically coupled with the bladder and configurable between a compressed condition and a withdrawn condition, and a control cable coupled with the actuator and fixed with the interior for linking the configuration of the actuator with the position of the seatback.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
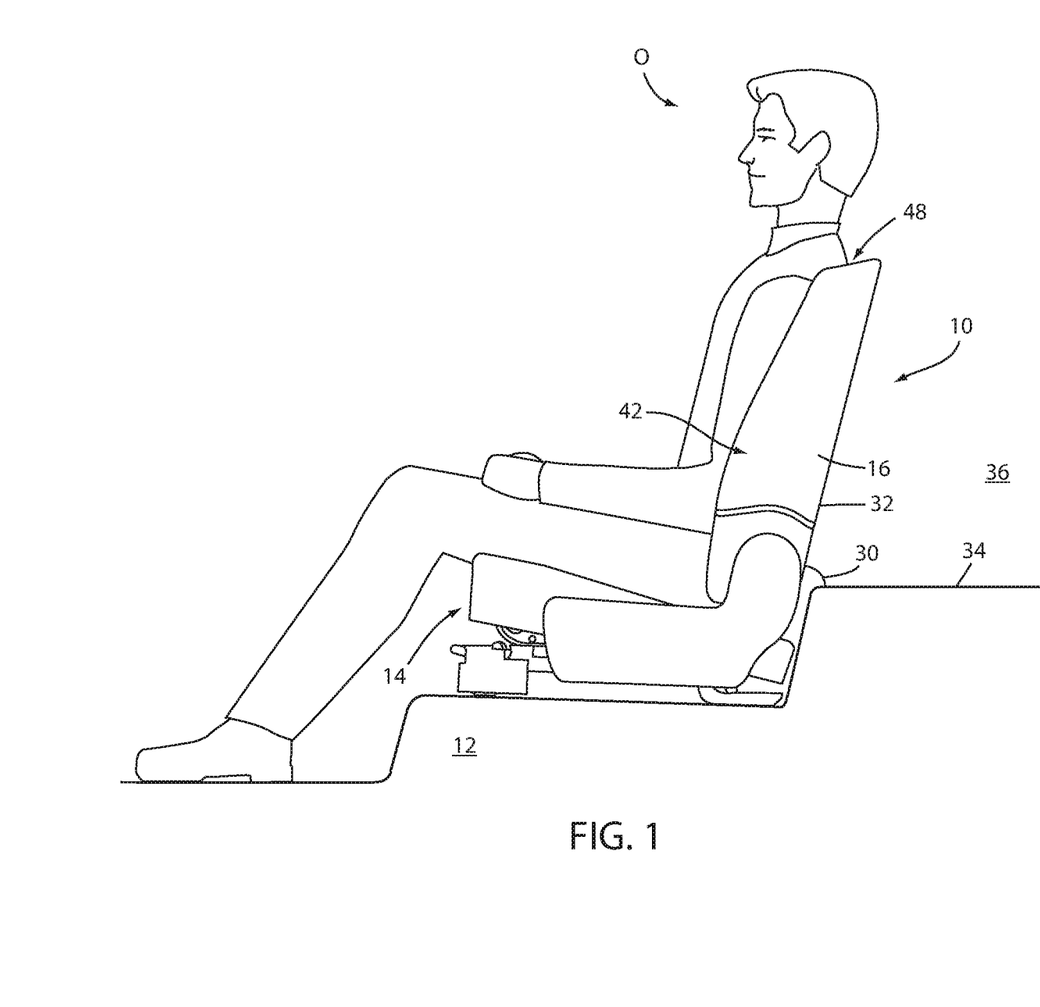
FIG. 1 is a side view of a portion of a vehicle interior including a vehicle seat according to an aspect of the disclosure, the seat being occupied by an occupant.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring to FIGS. 1 and 3-7, reference numeral 10 generally designates a seat for a vehicle 12. Vehicle seat 10 includes a cushion 14 and a seatback 16 coupled with the cushion 14 and rotatable between collapsed (FIGS. 6 and 7) and open (FIGS. 1, 4, and 5) positions. The seatback 16 includes a first inflatable bladder 18 within an interior 20 of the seatback 16, a pneumatic actuator 22 fluidically coupled with the bladder 18 and configurable between a compressed condition (FIGS. 4 and 5) and a withdrawn condition (FIGS. 6 and 7), and a control cable 24 coupled between the actuator 22 and the cushion 14 for linking the configuration of the actuator 22 with the position of the seatback 16.

Figure 2:
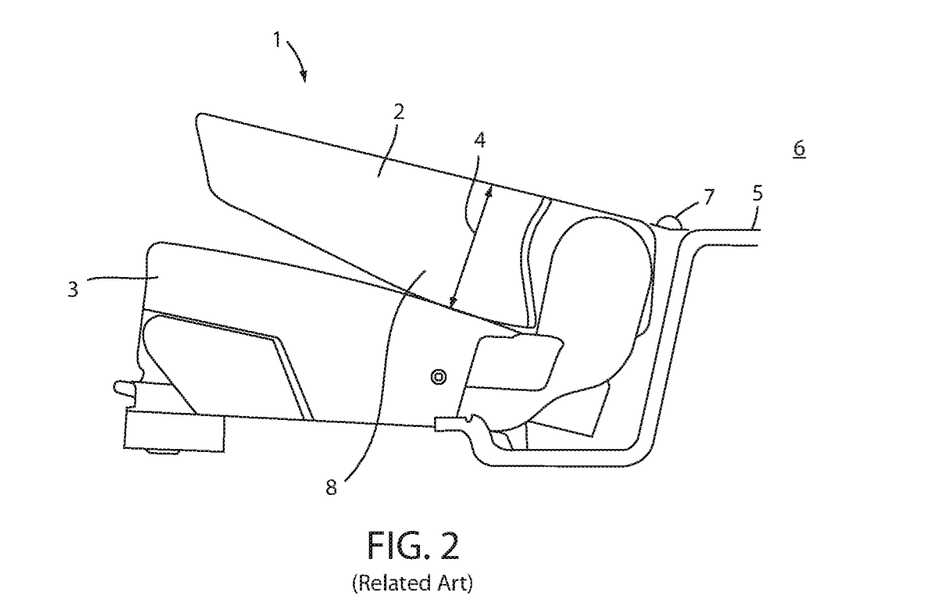
FIG. 2 is a side view of a related art vehicle seat in a collapsed configuration.
Figure 3:
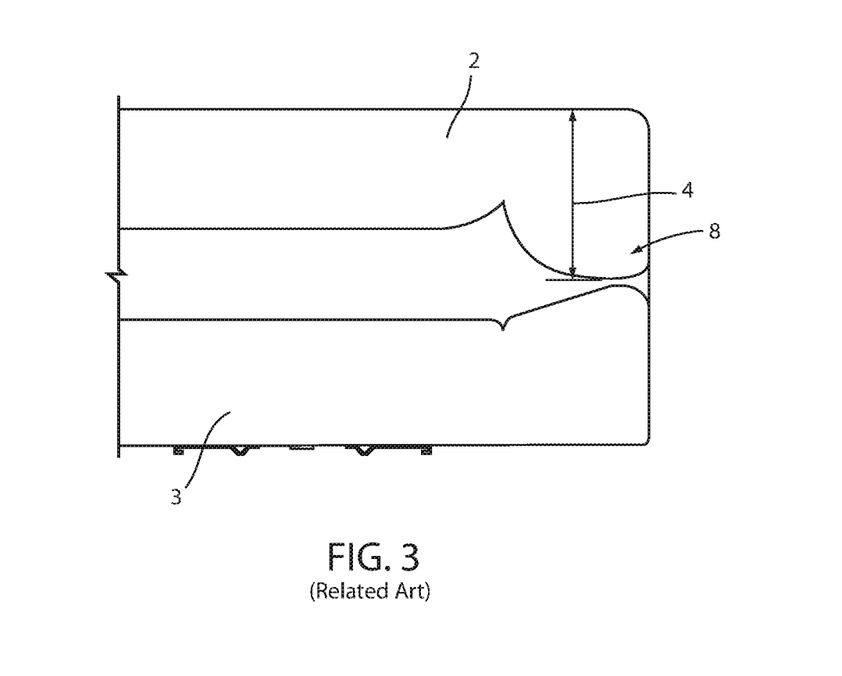
FIG. 3 is a front view of a portion of the related art seat of FIG. 2.
Figure 4:
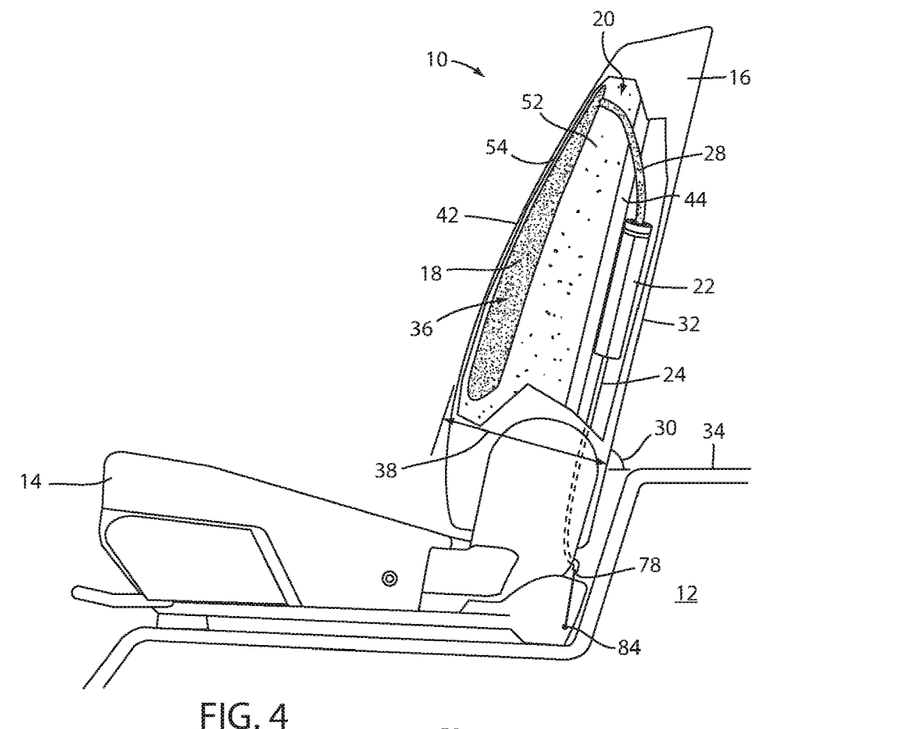
FIG. 4 is a partial cutaway side view of the vehicle seat of FIG. 1.

As shown in FIG. 1, the structure of vehicle seat 10 may be similar to the seat 1 shown in FIGS. 2 and 3, which may be typically found in connection with the rear seats of a vehicle. As in seat 1, the present seat 10 is such that the folding provided by vehicle seat 10 (as shown in FIG. 4) can be used to increase the cargo capacity of an adjacent storage area 6 of the associated vehicle. Such a folding configuration can also be used in one or more of the front seats of the associated vehicle, such as the passenger-side front seat. Accordingly, the various features of vehicle seat 10 discussed herein may be particularly described with reference to a vehicle seat 10 positioned toward the rear of the associated vehicle 12, and may be implemented in connection with, for example, a rear bench-style seat (such as a 60/40 split-folding rear bench), rear captain-style seats, or the like. Such features, however, may also be usable in connection with a front passenger seat.

Figure 6:
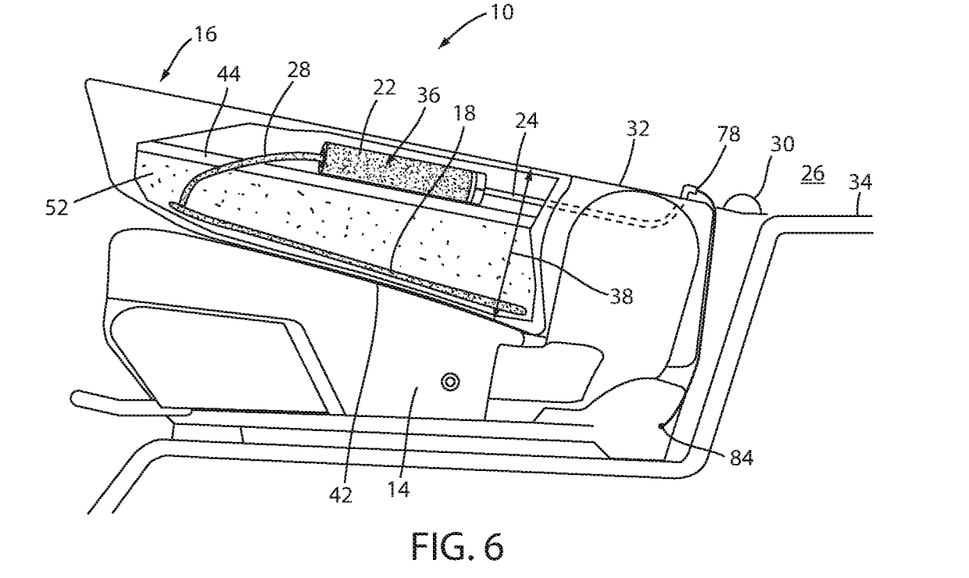
FIG. 6 is a partial cutaway side view of the vehicle seat of FIG. 1 in a collapsed configuration.
Figure 7:
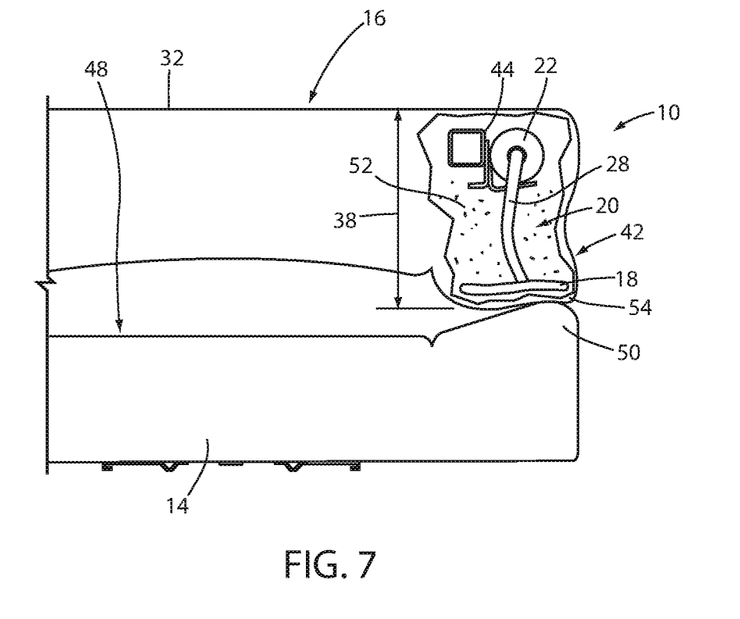
FIG. 7 is a front partial cutaway view of a portion of the vehicle seat of FIG. 6.

With reference to FIGS. 6 and 7, the incorporation of pneumatic actuator 22 and bladder 18 connected, for example, by fluid line 28 (which couples with bladder 18 and pneumatic actuator 22 on opposite ends thereof), can provide for an alteration of the profile of seatback 16 when seat 10 is in the closed configuration such that an angle 30 of rear seatback surface 32 with respect to trunk floor 34 of about 6°, or less can be achieved. Further, such features may allow seatback 16 to provide a comfortable contour for an occupant O (FIG. 1) when seated in seat 10, as shown in FIG. 1. In particular, the various features of cushion 14 provide for such variation in the contour of seatback 16 by facilitating transfer of flowable medium 36 between inflation fluid actuator 22 and bladder 18 with movement and/or reconfiguration of seatback 16 between the open configuration and the collapsed configuration. In particular, the above-mentioned control cable 24 links the configuration of fluid actuator 22 between the compressed position, in which the flowable medium 36 is forced into bladder 18 under pressure of actuator 22 and the withdrawn position, in which the fluid actuator 22 applies negative pressure to the flowable medium 36 to draw the flowable medium 36 out of bladder 18. This movement of flowable medium 36 into and out of bladder 18 under pressure from actuator 22 causes reconfiguration of the shape of seatback 16 by expansion and collapsing of the area overlying bladder 18, as discussed further below.

Fluid actuator 22, bladder 18, and fluid line 28 can be of a generally air-impermeable material, such as plastic or the like, such that the actuator 22, bladder 18, and fluid line 28 define a closed unit or system containing a fixed quantity of the flowable medium 36 therein. In an example, bladder 18 can be configured to contain the flowable medium 36, which in one embodiment is air, and in another embodiment can be a generally pure inert gas, such as Nitrogen or the like at a predetermined volume. For example, the closed system including bladder 18, actuator 22, and fluid line 28 can include between about 100 ml and 250 ml of air, depending, for example on the desired size of bladder 18, as discussed further below. In this manner, the configuration of the fluid actuator 22 between the compressed condition and the withdrawn condition can be such that, in the compressed condition, a majority (e.g., at least 90%) of flowable medium 36 is forced out of fluid actuator 22 and into bladder 18. In this manner, bladder 18 and fluid line 28 can, together, have a volume less than the quantity of flowable medium 36 expelled from actuator 22 such that the flowable medium 36 at least within bladder 18 has a pressure above ambient to provide a desired level of firmness and/or support for seatback 16 in the area of bladder 18. In an embodiment, bladder 18 can include one or more support columns therein to reduce the amount of flowable medium 36 needed to expand bladder 18 and/or to provide a more uniform thickness of bladder 18 when filled, if desired.

In the withdrawn state, actuator 22 can draw in the quantity of flowable medium 36 expelled in the compressed state (e.g., about 90%). The majority of the drawn in flowable medium 36 can be from bladder 18, which contracts to allow for flowable medium 36 to move out of bladder 18 and into actuator 22. In this manner, a portion of the flowable medium 36 may remain within fluid line 28 (and within bladder 18, due to uneven contraction or the particular geometry thereof). To achieve a more complete withdrawal of flowable medium 36 from bladder 18, actuator 22 may be somewhat larger, in the withdrawn condition, than the volume of flowable medium 36 that is moved into bladder 18 when actuator 22 is in the compressed condition. This sizing of actuator 22 can result in a pressure within actuator 22 that is less than ambient when in the withdrawn condition, thereby forcing the collapse of bladder 18 and a more complete withdrawal of air from bladder 18 than would otherwise be possible.

Figure 5:
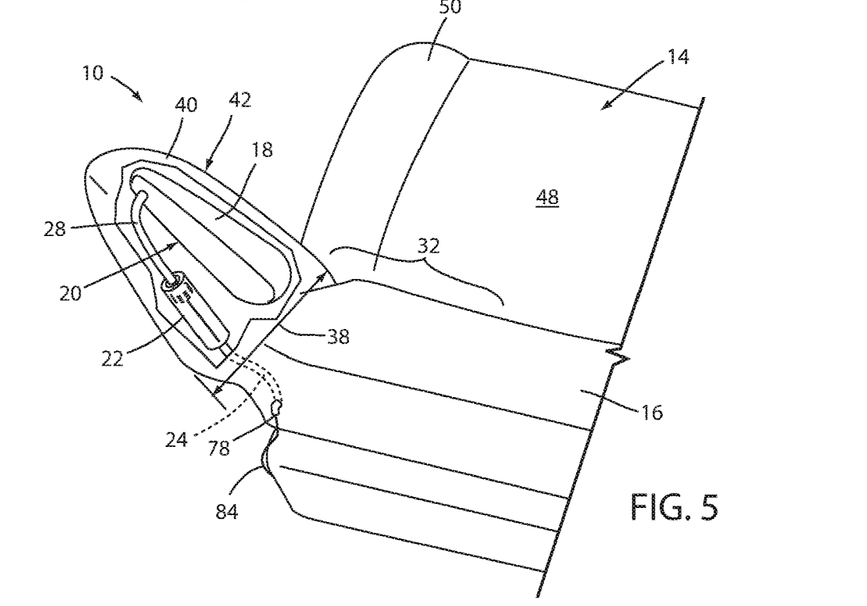
FIG. 5 is a partial cutaway overhead perspective view of the vehicle seat of FIG. 1.

As shown in FIGS. 4-7, bladder 18 is configured and positioned within seatback 16 such that the above-described transfer and withdraw of flowable medium 36 to and from bladder 18 by fluid actuator 22 causes a change in the profile of seatback surface 32, at least in the area overlying bladder 18. In particular, the change in profile of seatback surface 32 can serve to reduce the thickness 38 of seatback 16 in the area overlying bladder 18. As illustrated, in FIGS. 6 and 7, the strategic positioning of bladder 18 in relatively thicker areas of seatback 16, including those that protrude within seatback surface 32 can result in collapsing of those areas to the localized thickness 38 of seatback 16 in such areas to effectively reduce the overall, or maximum, thickness 38 of seatback 16. As discussed above, linking the movement of seatback 16 with the configuration of actuator 22 can allow for the expansion and increased protrusion of the area of seatback surface 32 when seatback 16 is in the open, upright position (including when it is occupied by an occupant O (FIG. 1)) and contract such areas when seatback 16 is in the collapsed position shown in FIGS. 6 and 7. As illustrated, this collapsing may allow for a more pronounced shaping of seatback surface 32 when in use by occupant O, while generally flattening seatback surface 32, when seatback 16 is folded downward. This collapsing, in turn, can allow seatback 16 to fold downward to a greater extent than otherwise allowed (as depicted in FIGS. 4 and 5) to result in a greater angle 30 and a flatter folding seatback 16 (i.e. closer to parallel with floor 34 of storage area 26).

In particular, the depicted embodiment of seatback 16 includes a bolster region 42 defined at an outer edge of seatback 16. In general, seatback bolsters include protruding areas extending vertically and positioned outwardly of the portion of seatback intended to support the occupant's back. In this manner, bolsters 42 are intended to be positioned adjacent to or in contact with the side of an occupant's lower- or mid-torso to provide lateral support for the occupant during lateral acceleration of vehicle 12 (such as during cornering or the like). This positioning and support may result in a more comfortable riding experience for the occupant O who may be required to use less of his or her own effort to maintain an upright position during lateral movement of vehicle 12. Some also may prefer the secure feeling provided by the additional contact with seat 10 within the extending bolster region 42. In this manner, it may be desired to provide a seatback 16 included in the folding rear or middle row vehicle seat 10 depicted herein. As shown in FIGS. 2 and 3, however, the presence of outwardly extending bolsters 8 in the related art vehicle seat 1 may result in an increase in the thickness 4 of the corresponding seatback 2. As illustrated, this increased thickness 4, particularly in the lower area of seatback 2 in which bolsters 8 may be the most prominent, may interfere with the ability of seatback 2 to effectively fold downward due to interference with cushion 3, which results in the angle 7 between floor 5 of storage area 6 being noticeably less than 180 degrees. This inability of seatback 2 to approach a flat-folding state may reduce the overall cargo volume of the vehicle in which seat 1 is included or may make it difficult to load the resulting expanded storage area 6, due to the slope defined by the rearward surface of seatback 2. Accordingly, the ability to reduce the thickness 38 of the present seatback 16 by collapsing bolsters 42 in seat 10 may remove or reduce the interference of bolsters 42 with folding of seatback 16 into the collapsed position (FIGS. 6 and 7), resulting, as discussed above in a greater angle 30 and a generally more flat-folding seatback 16.

It is noted that seatback 16 can include multiple bolster regions 42 at various locations therealong, depending on the particular configuration of seatback 16 and/or of vehicle seat 10 overall. In particular, seat 10 may provide a plurality of designated seating positions 48 along a width of seat 10. In one example, seat 10 may be a single unit with a cushion 14 extending the entire width of the interior of vehicle 12 with seatback 16 being similarly configured. In such an example, seat 10, including both cushion 14 and seatback 16 may define three seating positions 48 in the form of two side seating positions positioned, for example, adjacent respective opposite vehicle doors, with a middle seating position therebetween. In such an example, seatback 16 may include bolsters 42 on opposite sides thereof so as to be positioned outward of the side seating positions 48. Further, such seatback 16 may also include additional bolsters 42 adjacent the inward portions of the side seating positions 48, between the respective side seating positions 48 and the middle seating position 48. In another example, seat 10 may be a 60/40 folding seat with two seatbacks 16 of different widths, one such seatback 16 defining one side seating position 48 and the middle seating position 48, and the other seatback 16 defining the other side seating position 48, with either of the above-described bolster arrangements adapted to be interspersed among the seatbacks 16. In one variation, the single position seatback 16 may include a single bolster 42 on the outward side thereof, with the multi-position seatback 16 defining one bolster 42 positioned adjacent the outer side thereof and, optionally, additional bolsters 42 on opposite sides of the middle seating position 48. In another variation, each such seatback 16 may include two bolsters 42 on opposite sides of each respective side seating position 48. In yet another example, a 60/40 arrangement may be accomplished by two adjacent seats 10 with cushions 14 and seatbacks 16 sized in a similar manner to the seatbacks 16 of the above-described arrangement and bolsters 42 distributed between the seats 10 in a similar manner to the variations also described above. Other arrangements are also possible.

In any of the variations of seat 10 just described, as well as others that exist or may be apparent based on the above description, the various bolsters 42 may each have a respective bladder 18 therebeneath. In various implementations thereof, each bladder 18 may have a respective fluid actuator 22 coupled therewith by respective fluid lines 28 in individual closed systems, as described above. Further, each fluid actuator 22 may have a respective control cable 24 coupled therewith to link movement of the seatback 16 in which actuator 22 and bladder 18 are present with reconfiguration of the actuator 22 between its own withdrawn or compressed position and, accordingly, collapsing and expansion of the bladder 18, as described above. Alternatively, each seatback 16 or a sole seatback 16, depending on the particular configuration of seat 10 may include therewith a single fluid actuator 22 coupled by multiple or branching fluid lines 28 to each of the bladders 18 included therewith. In such a variation, each actuator 22 can have, in the withdrawn condition, a fluid capacity equal to at least the combined volume of each bladder 18, with which it is coupled, in the expanded condition so that actuator 22 can cause collapsing of all such bladders 18. Actuator 22 is linked with cushion 14 in the manner discussed above with control cable 24.

In an additional variation, seatback 16 may define seatback surface 32 such that the bolster regions 42 thereof do not appreciably protrude from adjacent portions of seatback surface 32, but include bladders 18 therebeneath such that seatback surface 32 can collapse, such as by defining concave areas therein that receive cushion bolsters 50 therein to allow for similar flat or near-flat folding of seatback 16 in an similar manner to that which is described above.

As can be seen in the cutaway views of FIGS. 4-7, seatback 16 may include an internal support 44 or frame therein that gives seatback 16 its general shape and structural support for other components of seatback 16. As shown, fluid actuator 22 may be mounted with support 44 to provide rigid placement therefore and to maintain a constant positioning within seatback 16 and, accordingly, a consistent spatial relationship with control cable 24. Other placements within seatback 16 may be used to maintain such relationships and positioning. Seatback 16 may also include a foam layer 52 generally surrounding and/or extending away from support 44 and supporting a coverstock 54 that includes a fabric or leather outer layer that defines seatback surface 32. In this manner, bladder 18 can be positioned beneath coverstock 54 to force the corresponding area of coverstock 54 outwardly with expansion of bladder 18. In this manner, bladder 18 can be positioned directly beneath coverstock 54 on a portion of foam layer 52 or on a correspondingly configured portion of support 44. In a variation, bladder 18 can be positioned within or beneath foam layer 52, as desired to provide both the desired configuration for bolster 42 when in the expanded and contracted positions, including shape, firmness, and the like.

Figure 8:
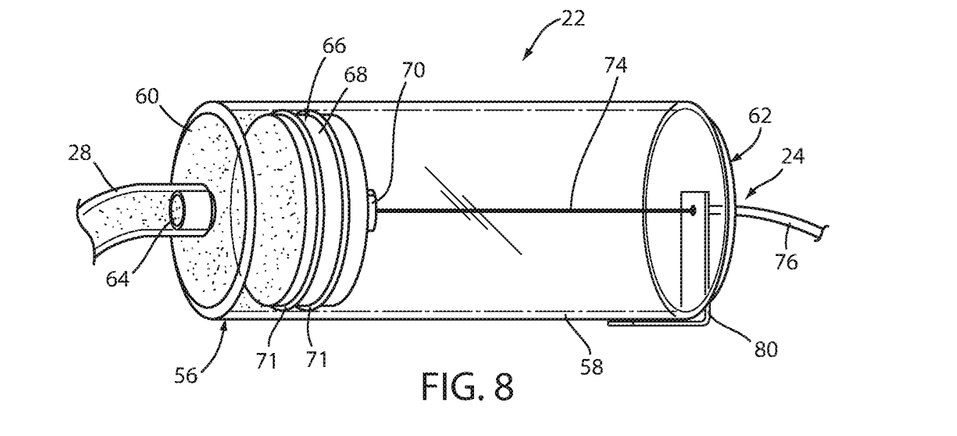
FIG. 8 is a perspective view of a fluid actuator of the vehicle seat of FIG. 1, the actuator shown in a compressed condition.
Figure 9:
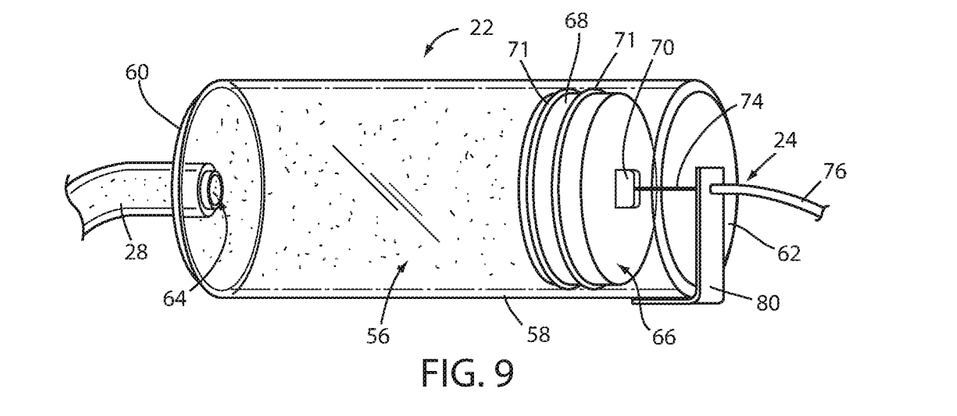
FIG. 9 is an opposite perspective view of the fluid actuator of FIG. 8 in a withdrawn condition.

Turning now to FIGS. 8 and 9, the configuration of an implementation of actuator 22, as also shown in FIGS. 4-7, includes one portion in the form of an elongate chamber 56 similar to that of a syringe or the like. Elongate chamber 56 includes a tube-shaped body portion 58 and an enclosed end 60 opposite an open end 62. The closed end 60 defines an outlet 64 to which fluid line 28 is coupled, although such an outlet could be incorporated into tube-shaped body portion 58 in an area disposed toward closed end 60, if desired. Actuator 22 further includes a piston 66 received within elongate chamber 56. In particular, piston 66 includes a cylindrical body 68 that can fit within an inner perimeter of the tube-shaped body portion 58 of elongate chamber 56 to form a fluid-tight seal therebetween, as well as an extension 70 to which control cable 24 is coupled. In an embodiment, cylindrical body 68 can include a sealing member 71, such as one or more O-rings or the like to facilitate such a seal. Otherwise, cylindrical body 68 itself can be configured, by one or both of the material and particular shape thereof, for such a sealing engagement. In either implementation, the fit between cylindrical body 68 and tube-shaped body portion 58 may be such that, while maintaining the desired fluidic seal, the components can be moved relative to each other. In this manner, movement of cylindrical body 68 within tube shaped body portion 58 toward and away from closed end 60 (in particular between proximal-most and distal-most positions with respect to outlet 64) respectively correspond with configuration of actuator 22 between the compressed position (FIG. 8) and the withdrawn position (FIG. 9) by effectively reducing and expanding the volume of actuator 22, as defined by the distance between cylindrical body 68 and closed end 60 by the diameter of tube-shaped body portion 58. This change in volume, thereby causes expansion of bladder 18 (FIGS. 4 and 5) and collapsing of bladder 18 (FIGS. 6 and 7) by forcing air out of actuator 22 or drawing air thereinto, respectively, by such change in volume.

As further illustrated in FIGS. 8 and 9, the control cable 24 is coupled with the piston 66 of the pneumatic actuator 22 to move the piston 66 between the proximal-most positon and the distal-most position with respect to outlet 64. Accordingly, this coupling links movement of piston 66 with movement of seatback 16 such that movement of seatback 16 into the open position (FIGS. 4 and 5) causes movement of piston 66 toward closed end 60 and outlet 64, corresponding with the compressed condition of actuator 22, and movement of seatback 16 into the closed position (FIGS. 6 and 7) causes movement of piston 66 away from closed end 60 and outlet 64, corresponding with the withdrawn condition of actuator 22.

To achieve this linking between the position of seatback 16 and the condition of actuator 22, control cable 24 is affixed oppositely from piston 66 with a portion of cushion 14 (or another portion of seat 10 that is fixed relative to the rotation of seatback 16). Further, control cable 24 is routed such that it extends along a longer path when seatback 16 is in the collapsed position that when seatback 16 is in the open condition. As shown in FIGS. 5 and 6, this positioning can include extending from seatback 16, for example at a location 78, positioned along or adjacent the rear surface of seatback 16, which by way of the rotating configuration of seatback 16 with respect to cushion 14 is closer to cushion 14 when in the open position and farther from cushion 14 when seatback 16 is in the collapsed position. This, or other similar arrangements, pull piston 66 in a direction away from closed end 60 when seatback 16 is moved into the collapsed position. In a similar manner, control cable 24 can be configured to exert a pushing force on piston 66 to force piston 66 in a direction toward closed end 60 when seatback 16 is moved into the open position. In one example, this can be achieved by configuring control cable 24, at least in part, with rigidity sufficient to remain straight under axial loading greater than the friction force between cylindrical body 68 and tube-shaped body portion 58. In one embodiment, control cable 24 can include a monofilament steel wire such as filament portion 74, of a gauge sufficient to achieve such rigidity.

Further, control cable 24 can include multiple components, including, in one embodiment, the above-mentioned filament portion 74. In one example, control cable 24 can include a jacket 76 through which a filament portion 74 at least partially extends. The incorporation of jacket 76 can allow control cable 24 to be unanchored at least along a portion thereof such that cable 24 can route around various internal elements of seatback 16 while maintaining a consistent length thereof. In the depicted embodiment, jacket 76 can extend between the exit location 78 (FIGS. 4-6) of cable 24 from seatback 16 and a bracket 80 positioned adjacent or incorporated into actuator 22. This configuration can allow for filament portion 74 to extend between piston 66 and the coupling point 84 of cable 24 with cushion 14 to affect the above described linking between the position of seatback 16 and the configuration of actuator 22. In another embodiment, the inner portion of cable 24 can include a more flexible portion, such as a multifilament portion disposed between filament portion 74 that extend outwardly from jacket 76. This configuration can reduce friction of the inner portion within jacket 76. As shown above, the geometry of seat 10, including the shapes of and relative positioning between seatback 16 and cushion 14, can influence the distance by which cable 24 can pull piston 66 relative to elongate chamber 56. In this manner, the elongate chamber 56 and piston 66 can be configured to provide the desired volume thereof, as discussed above, when in the withdrawn state and to deliver flowable medium 36 to bladder 18 under the desired pressure, given the available travel provided by cable 24. In particular, the diameter of elongate chamber 56 and piston 66 can be continued to provide the desired capacity for flowable medium 36 based on the available travel of piston 66 within elongate chamber 56.

Figure 10:
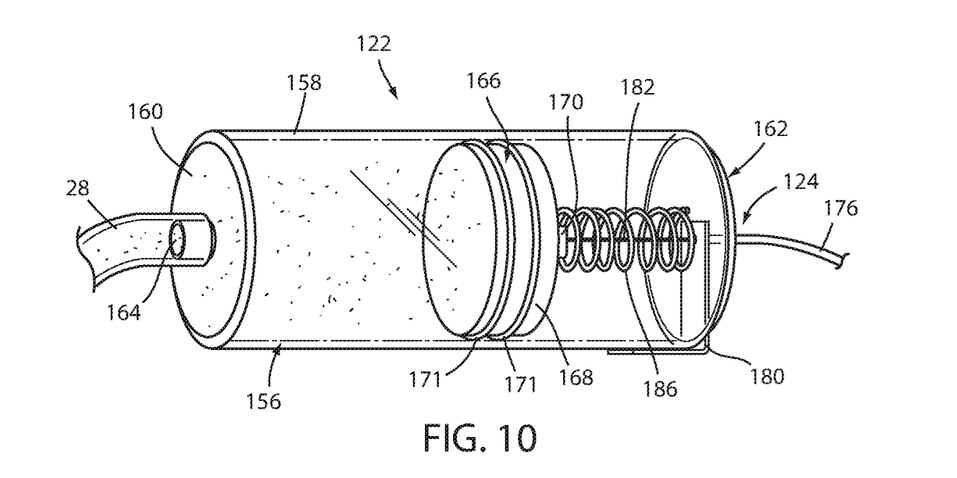
FIG. 10 is a perspective view of an alternative fluid actuator useable in the vehicle seat of FIG. 1.

In an alternative embodiment shown in FIG. 10, actuator 122 can include a spring 186 disposed between bracket 180 and cylindrical body 168, for example, to urge cylindrical body 168 into the distal-most position with respect to closed end 160 of elongate chamber 156. In such an arrangement, control cable 124 can include flexible inner portion 182, such as of a multifilament twisted cable, that extends through jacket 176 between piston 166 and the corresponding coupling point 84 with the cushion 14 of seat 10, in a similar manner to that which is discussed above. In this manner, control cable 124 pulls piston 166 against the compressive force of spring 186 to move piston 166 into the distal-most position with respect to outlet 164 when seatback 16 is in the collapsed position. When seatback 16 is moved to the open position, the control cable 124 extends from jacket 176 to allow spring 186 to extend, forcing piston 166 toward outlet 164 and into the proximal-most position with respect thereto. In this manner, the configuration of actuator 122 achieves the same expansion and collapsing of bladder 18 by movement of seatback 16, as described above.

It is to be understood that variations and modifications can be made on the aforementioned structure without departing from the concepts of the present disclosure, and further it is to be understood that such concepts are intended to be covered by the following claims unless these claims by their language expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A vehicle seat, comprising:
a cushion;
a seatback coupled with the cushion and rotatable between collapsed and open positions, the seatback including:
a first inflatable bladder within an interior of the seatback;
a support frame within the interior of the seatback;
a pneumatic actuator fixedly coupled to the support frame and fluidically coupled with the bladder, and moveable between a compressed condition and a withdrawn condition; and
a flexible control cable coupled between the actuator and a coupling point on the cushion, wherein the coupling point is fixed relative to rotation of the seatback, and wherein the flexible control cable moves the actuator with rotation of the seatback.

2. The vehicle seat of claim 1, wherein the pneumatic actuator includes an elongate chamber having an outlet and a piston sealingly engaged with an inner perimeter of the chamber and slideable toward and away from the outlet, the compressed condition corresponding to the piston being in a proximal-most position with respect to the outlet and the withdrawn condition corresponding to the piston being in a distal-most position with respect to the outlet.

3. The vehicle seat of claim 2, wherein the flexible control cable is coupled with the piston of the pneumatic actuator and moving the piston between the proximal-most positon and the distal-most position.

4. The vehicle seat of claim 2, wherein the pneumatic actuator is coupled with the first inflatable bladder at the outlet of the elongate chamber.

5. The vehicle seat of claim 2, wherein the pneumatic actuator further includes a spring biasing the piston toward the proximal-most position, the control cable acting against the spring under tension to pull the piston into the distal-most position when the seatback is moved into the collapsed position.

6. The vehicle seat of claim 2, wherein the flexible control cable defines a rigid portion coupled with the piston and applies a force thereon to urge the piston toward the proximal-most position with respect to the outlet.

7. The vehicle seat of claim 1, wherein the pneumatic actuator is fluidically coupled with the inflatable bladder such that movement of the actuator from the withdrawn condition to the compressed condition causes a fluid pressure within the bladder to increase.

8. The vehicle seat of claim 7, wherein:
the increase in the fluid pressure urges the bladder into an expanded condition; and movement of the actuator from the compressed condition to the withdrawn condition causes the fluid pressure within the bladder to decrease, urging the bladder into a contracted position.

9. The vehicle seat of claim 1, wherein:
the pneumatic actuator is fluidically coupled with the inflatable bladder to cause inflation and deflation of the bladder with configuration of the actuator in the compressed condition and the withdrawn condition, respectively; and
the inflation and deflation of the inflatable bladder causes a thickness of a portion of the seatback corresponding with the bladder to increase and decrease, respectively.

10. The vehicle seat of claim 9, wherein the first inflatable bladder is positioned beneath a seatback coverstock in a bolster area of the seatback.

11. The vehicle seat of claim 9, wherein the movement of the actuator by rotation of the seatback by the flexible control cable is such that the thickness of the portion of the seatback is at a maximum when the seatback is in the open position and is at a minimum when the seatback is in the collapsed position.

12. The vehicle seat of claim 1, wherein the flexible control cable is internal within the seatback and exits the seatback in a location that is disposed toward a rear of the seatback when the seatback is in the open position.

13. The vehicle seat of claim 1, further including a second inflatable bladder within the interior of the seatback, the pneumatic actuator being further fluidically coupled with the second inflatable bladder.

14. A vehicle seat, comprising:
a cushion;
a seatback coupled with the cushion and rotatable between collapsed and open positions, the seatback including:
an inflatable bladder within an interior of the seatback;
an elongate chamber disposed within the interior of the seatback and fluidically coupled with the inflatable bladder and a piston sealingly engaged with an inner perimeter of the chamber; and
a control cable including a filament portion and coupled between the piston and a fixed point relative to rotation of the seatback on the cushion for sliding the piston within the chamber by rotation of the seatback.

15. The vehicle seat of claim 14, wherein:
the elongate chamber has an outlet disposed at a first end thereof; and
the piston is slideable within the chamber toward and away from the outlet between a compressed condition corresponding to the piston being in a proximal-most position with respect to the outlet and a withdrawn position corresponding to the piston being in a distal-most position with respect to the outlet.

16. The vehicle seat of claim 15, wherein the pneumatic actuator further includes a spring biasing the piston toward the proximal-most position, the control cable acting against the spring under tension to pull the piston into the distal-most position when the seatback is moved into the collapsed position.

17. The vehicle seat of claim 15, wherein the control cable defines a rigid portion coupled with the piston and applies a force thereon to urge the piston toward the compressed condition.

18. The vehicle seat of claim 14, wherein:
the elongate chamber is fluidically coupled with the inflatable bladder to cause inflation and deflation of the bladder with movement of the piston; and
the inflation and deflation of the inflatable bladder causes a thickness of a portion of the seatback corresponding with the bladder to increase and decrease, respectively.

19. The vehicle seat of claim 18, wherein the inflatable bladder is positioned beneath a seatback coverstock in a bolster area of the seatback.

20. A vehicle, comprising:
a seatback coupled within an interior of the vehicle and rotatable between collapsed and open positions;
an inflatable bladder within an interior of the seatback;
a pneumatic actuator fluidically coupled with the bladder and configurable between a compressed condition and a withdrawn condition; and
a control cable extending along a path within the interior of the seatback and coupled with the actuator and fixed with the interior of the vehicle, wherein the path is longer when the seatback is in the collapsed position for moving the actuator with rotation of the seatback, and wherein the control cable is under tension when the seatback is in the collapsed position and configured to flex with movement of the seatback between the collapsed and open positions.

* * * * *